United States Patent
Lennartz et al.

(10) Patent No.: US 7,250,109 B2
(45) Date of Patent: Jul. 31, 2007

(54) BACK-WASH FILTER

(75) Inventors: Rudiger Lennartz, Pulheim (DE); Heinz Sindorf, Rommerskirchen (DE); Willi Rott, Bornheim (DE)

(73) Assignee: Boll & Kirch Filterbau GmbH, Kerpen (DE)

( * ) Notice: Subject to any disclaimer, the term of this patent is extended or adjusted under 35 U.S.C. 154(b) by 290 days.

(21) Appl. No.: 10/860,929

(22) Filed: Jun. 4, 2004

(65) Prior Publication Data

US 2004/0245160 A1 Dec. 9, 2004

(30) Foreign Application Priority Data

Jun. 4, 2003 (DE) ................. 103 25 525

(51) Int. Cl.
*B01D 35/12* (2006.01)
(52) U.S. Cl. .............. 210/333.01; 210/333.1; 210/409; 210/410; 210/411; 210/408
(58) Field of Classification Search ........ 210/409–412, 210/797–798, 120, 123, 408, 333.1, 333.01, 210/427, 108; 137/607; *B01D 35/12*
See application file for complete search history.

(56) References Cited

U.S. PATENT DOCUMENTS

| | | | |
|---|---|---|---|
| 3,394,735 A | | 7/1968 | Wurster |
| 3,425,557 A | * | 2/1969 | Rosaen ................. 210/108 |
| 4,256,583 A | * | 3/1981 | Lennartz ............... 210/333.1 |
| 6,197,195 B1 | * | 3/2001 | Booth et al. ............ 210/340 |
| 6,607,661 B2 | * | 8/2003 | Koivula ................. 210/120 |

FOREIGN PATENT DOCUMENTS

| | | | |
|---|---|---|---|
| DE | 3115716 | | 4/1982 |
| EP | 0046919 | | 8/1981 |
| JP | 11104412 A | * | 4/1999 |

OTHER PUBLICATIONS

EP 0 361 217 A1 Rott, Willi et al Apr. 4, 1990.
DE 197 34 588 Sindorf, Heinrich et al Feb. 11, 1999.

* cited by examiner

*Primary Examiner*—Krishnan S. Menon
*Assistant Examiner*—Benjamin Kurtz
(74) *Attorney, Agent, or Firm*—Orum & Roth LLC

(57) ABSTRACT

In the backflush filter (10) according to the invention, in which the flushing back of the filter inserts (15) which are received in several filter chambers takes place by means of flushing filtrate loaded by compressed air, the flush valve (35) and the mud drain valve (39) are actuated by a common drive, whereas the valves or the valve bores (45, 46) are dimensioned in such a manner that the flush valve only releases the connection to the filtrate chamber (19') of the filter inserts (15') to be flushed back, when the mud drain valve has already at least partially released the connection between the mud chamber (24') of the affected filter chamber (14') with a mud outlet (40). By this, it is ensured in a particularly simple manner that at the backflush process the pressure level in the mud chamber has already dropped before the filtrate for the backflush is loaded with compressed air (see FIG. 2).

6 Claims, 3 Drawing Sheets

BACK-WASH FILTER

This application claims priority to Application number 103 25 525.7 filed on 4 Jun. 2003 filed with the German Patent and Trademark Office.

BACKGROUND OF THE INVENTION

1. Field of the Invention

The invention relates to a backflush filter with several filter chambers which receive filter inserts which can be flushed back by means of a flush filtrate loaded with compressed air, with a filter housing, a backflush device rotatably mounted in the housing around a rotary axis which backflush device comprises a filtrate pipe connection and a mud drain connecting piece, whereby, for the backflush, the filtrate pipe connection can be brought into fluid communication with a filtrate chamber of respectively one of the filter chambers which are arranged concentrically around the rotary axis and simultaneously the mud drain connecting piece can be brought into communication with a mud chamber of the respectively one filter chamber, further with a pressure chamber for flush gas and a flush valve closing this or releasing it to the filtrate pipe connection, and with a mud outlet and a mud drain valve closing this or releasing it to the mud drain connecting piece.

2. Description of Related Art

Such a backflush filter is for example known from EP 0361217 B1. This known backflush filter is comparatively complicated in its design, it has in particular a relatively large installation height, which can be ascribed amongst others to the fact that the mud drain valve and the drive actuating it is flanged to the actual filter housing at the bottom, while the flush valve with its associated drive projects upwards from the filter housing. The use of two separate drives for the mud drain valve and the flush valve makes it necessary to provide a sequence control unit for these two valves which ensures that the flush valve is only opened after the opening of the mud drain valve, so that, at the start of the backflushing, the fluid pressure on the mud side of the filter inserts is broken down before the backflush process is initiated. With a breakdown of this sequence control unit, an orderly cleaning of the filter inserts is not ensured, which can possibly go unnoticed for a longer operating time of the backflush filter.

SUMMARY OF THE INVENTION

It is the object of the invention to improve a backflush filter of the above-mentioned type in such a manner that problems with the sequence control unit with the two valves cannot occur. Thereby, the constructive design of the filter shall be simplified and its construction volume preferably reduced with the same filter efficiency.

This object is solved by means of the invention in that the flush valve and the mud drain valve are actuated by a common drive, whereas the flush valve only releases the connection to the filtrate pipe connection when the mud drain valve has at least already partially released the connection between the mud drain connecting piece and the mud outlet. With it, it is particularly advantageous if the flush valve and the mud drain valve are coupled to one another mechanically.

According to the invention, the two valves are thus actuated by a common drive, so that it is not necessary anymore to coordinate two separate drives for the two valves by means of a sequence control unit. The preferably mechanical coupling of flush valve and mud drain valve ensures that the flush valve always opens at the same point in time after the mud drain valve, which can take place in a particularly preferred embodiment of the invention in that the flush valve and the mud drain valve are ball valves, whereby the flush ball valve then preferably has a ball bore which is smaller than the ball bore of the mud drain ball valve.

In this context, it can also be advantageous that the valve plug of the mud drain ball valve has a larger ball diameter than the valve plug of the flush ball valve, which is, amongst others, advantageous when the valve plugs of the two ball valves shall not be exchanged during their mounting or during maintenance. The valves can have a common drive shaft, that is, they are both rotated simultaneously and with the same angle during the opening and closing of the valve, whereby, due to the larger ball bore in the mud drain valve, this opens compulsorily before the flush valve and thereby the pressure on the mud side of the filter inserts has already been reduced to ambient pressure before the opening of the flush valve takes place.

In a preferred further development of a typical backflush filter, which has got an independent innovative importance, it is provided that an acceleration path for backflush fluid is provided between the flush valve and the filtrate pipe connection. The acceleration path is preferably essentially formed by a tube section at the backflush device, closed at one side, and a dip tube projecting into it preferably in a concentric manner which dip tube connects to the filtrate pipe connection. The backflush fluid, also filtrate, which is present in the closed tube section or in the dip tube, is pressed downwards in the closed tube section by the compressed air reaching the backflush device after opening the flush valve and flows with a high velocity through the dip tube immersed in the tube section to the filtrate pipe connection, and from there further into the filter inserts. These are preferably filter cartridges which are arranged in a suspended manner at a flange plate limiting the associated filter chamber upwardly, which comprises one or more openings to the filtrate chamber. The flush fluid reaches the filter cartridges through the openings and flows through these from the inside to the outside, whereby the contaminations, which have deposited themselves at the outer side of the filter cartridges are detached and are transported to the mud outlet through the mud drain connecting piece and the mud drain valve.

After the completion of the backflush process, the two valves are closed again by their common drive, whereupon the backflushed filter chamber is vented before or during the following filter process, whereby a float-actuated system vent valve is conveniently provided which can be arranged as a central float vent for the chamber and system in the upper region of the filter housing.

BRIEF DESCRIPTION OF THE FIGURES

Further characteristics and advantages of the invention result from the following description and the drawing, in which a preferred embodiment of the invention is explained in more detail by means of an example. It shows.

DETAILED DESCRIPTION OF THE INVENTION

Figure 1:
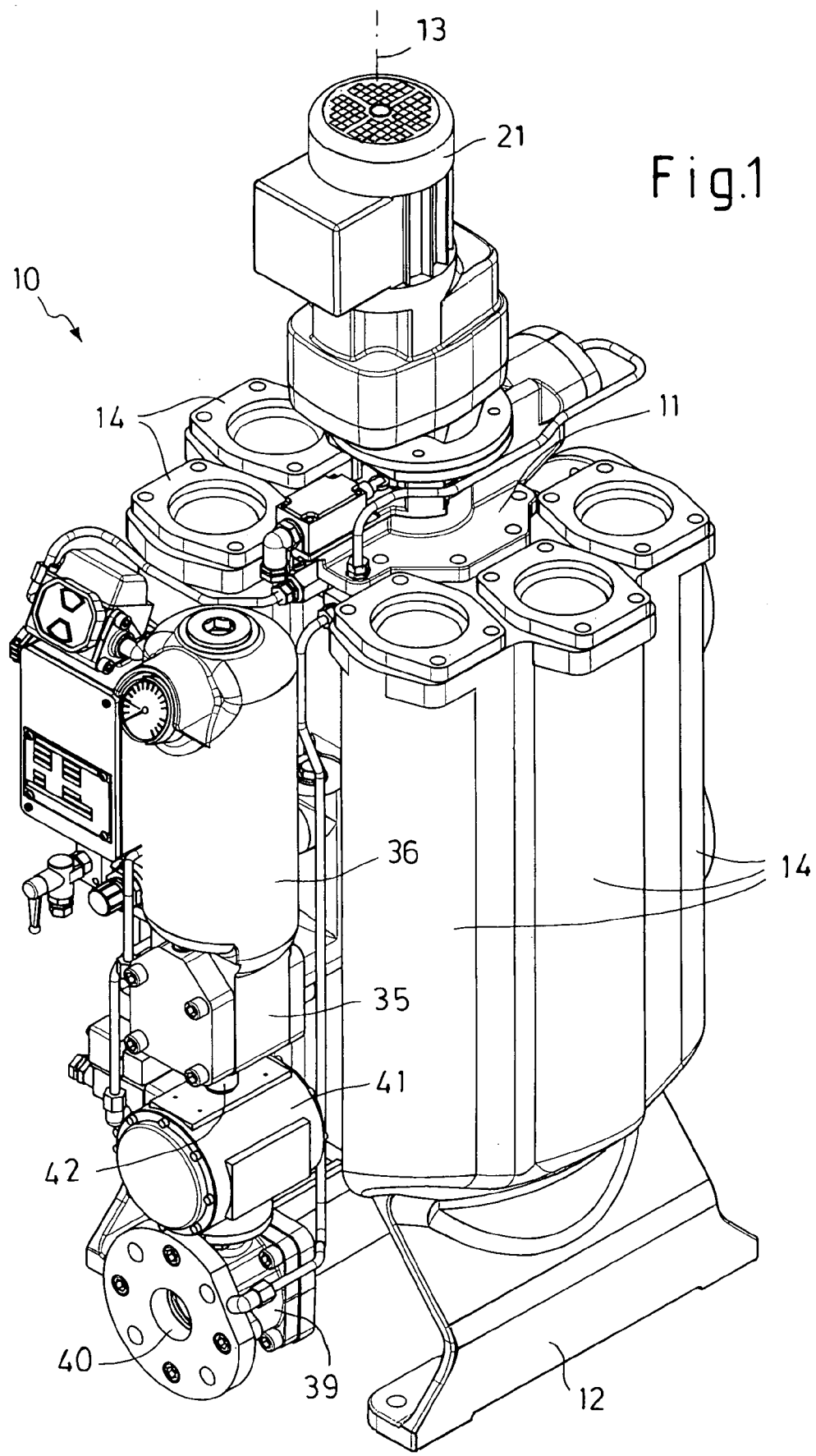
FIG. 1 a backflush filter according to the invention in a perspective view.

The backflush filter designated as 10 in its entirety in the drawing comprises a central filter housing 11 which is provided with a base 12 at the bottom, with which the filter can be attached at the location provided therefor.

The backflush filter comprises at least three filter chambers 14 which are arranged on a circle around a central axis 13, which receive filter inserts 15. The filter inserts are respectively several filter cartridges 16 which are arranged in a suspended manner at a flange plate 17 limiting the associated filter chamber 14, whereby the flange plate comprises an opening 18 for each filter cartridge 16, which connects the inside of the filter cartridge 16 to a filtrate chamber 19 present above the flange plate 17.

A backflush device 20 is arranged in the filter housing 11, which device is mounted in a rotatably switchable manner around the central axis 13. A drive motor 21, which is flanged to the upper side of the filter housing 11, provides the drive of the backflush device. The backflush device comprises a radial open filtrate pipe connection 22 at its upper end, which is brought into fluid connection with the associated filtrate chamber 19' for the backflushing of the filter inserts 15' inserted into respectively one filter chamber 14', by aligning the backflush device 20 by means of the drive motor 21 into the correspondingly desired position within the housing.

At the lower end of the backflush device 20 it is provided with a mud drain connecting piece 23 which is also radially open and points in the same direction as the filtrate pipe connection, so that it is in fluid connection with the mud chamber 24 of the filter chamber 14' surrounding the filter cartridges 16', which is to be flushed back.

The backflushing of the filter inserts of the individual filter chambers takes place in the backflush filter according to the invention by means of a flush filtrate which is loaded by compressed air. During the filtration process, and also immediately before the backflush process, the filtrate in the filtrate chambers 19 is above the filter chambers 14 as well as in the backflush device 20, that is, in the filtrate pipe connection 22, a dip tube 25 attached thereto downwardly concentric to the axis 13, as well as a tube section 26 surrounding this, which is closed by a closure flange 27 at its upper end. The closure flange 27 is guided in a sealed manner in the filter housing 11 and comprises a circumferential groove 30 as well as several radial bores 31 between its upper and lower seal 28 or 29, which bores connect the groove to an annular chamber 32 surrounding the dip tube 25, which is open at the bottom towards the lower tube section 26. At the height of the circumferential groove 30 in the filter housing 11 is situated the orifice 33 of a compressed air line 34 which can be connected to a compressed air store 36 by means of a first ball valve 35.

Figure 2:
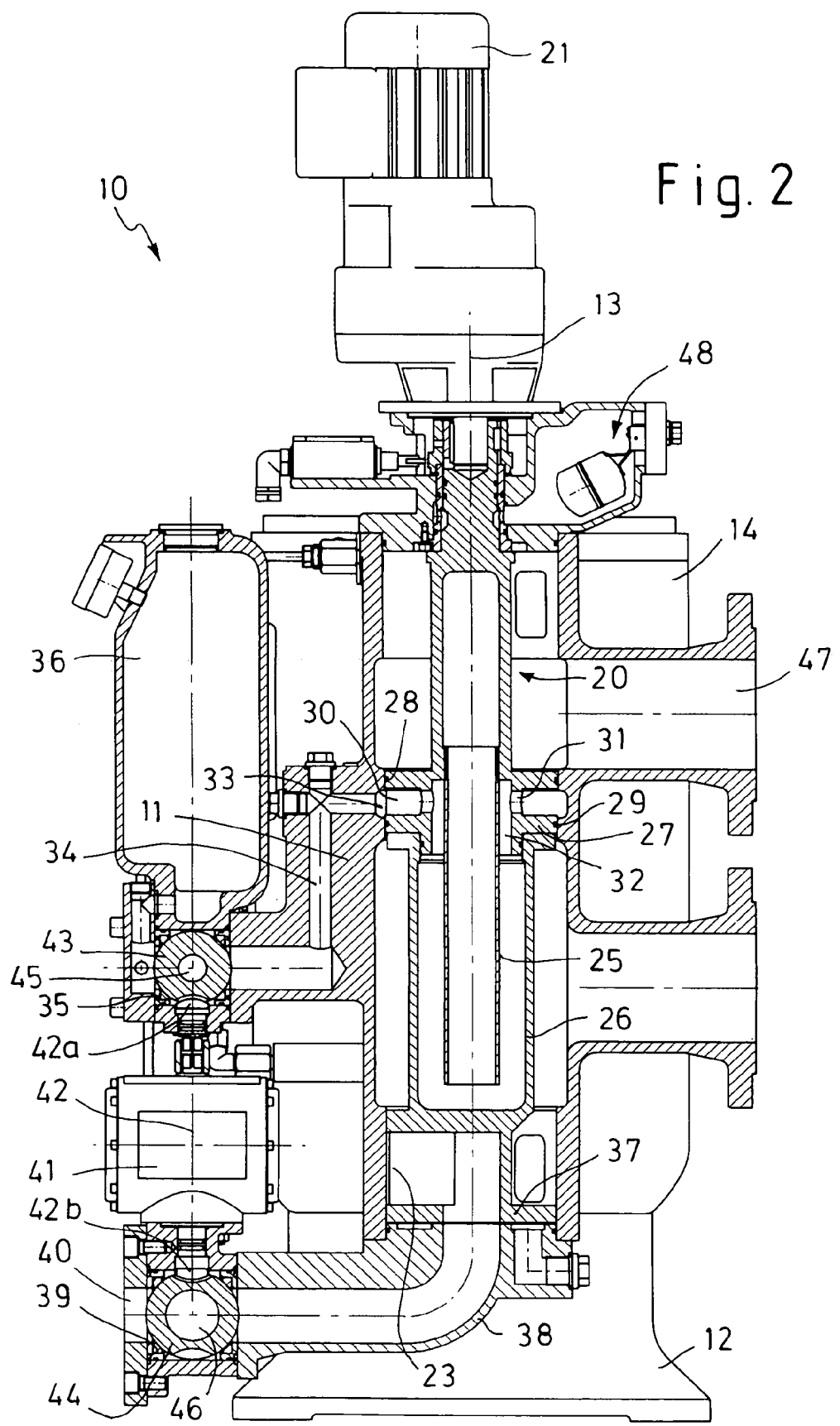
FIG. 2 the object of FIG. 1 in a longitudinal section.
Figure 3:
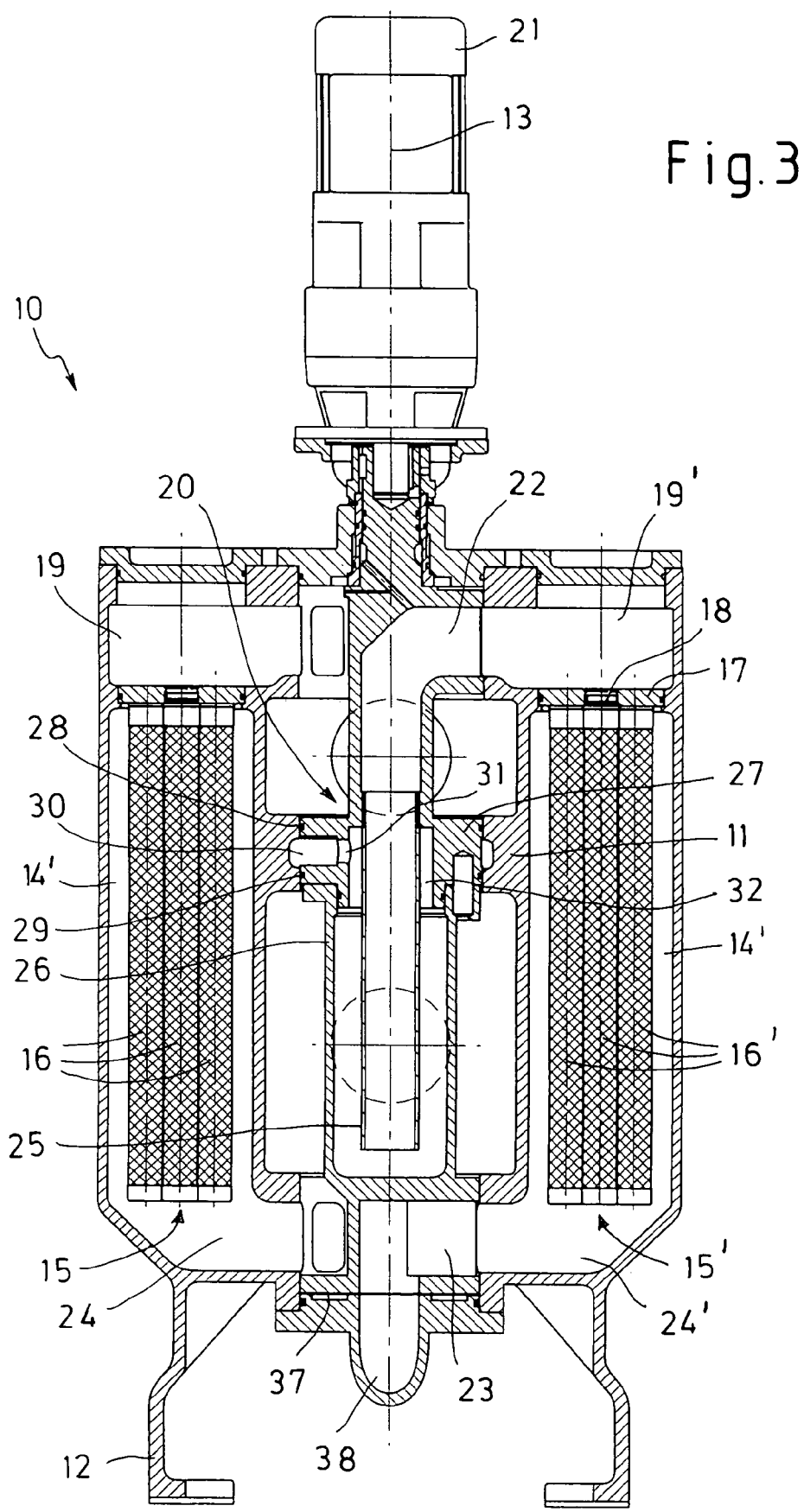
FIG. 3 a further longitudinal section through the backflush filter according to the invention, offset by 90° with regard to the depiction according to FIG. 2.

The mud drain connecting piece 23 at the lower end of the backflush device 20 goes into a mud drain line 38 by means of a rotating flange connection 37, which line can be closed by a second ball valve 39 towards a mud outlet 40. As can be best seen in FIG. 2, the first ball valve 35 forming a flush valve and the second ball valve 39 forming a mud outlet valve can be actuated by a common drive 41. This comprises a drive shaft 42 interspersing it vertically which is connected at its upper end 42a to the ball plug 43 of the flush valve 35 in a torque-proof manner and at its lower end 42b to the ball plug 44 of the mud drain valve 39 in a torque-proof manner. The arrangement is made in such a manner that the ball plug 43 of the flush valve 35 has a smaller outer diameter than the ball plug 44 of the mud drain valve 39. Furthermore, the ball bore 45 in the ball plug 43 of the first ball valve 35 is smaller than the ball bore 46 in the ball plug 44 of the second ball valve 39.

The backflush process with the backflush filter described up to now functions as follows:

For the backflushing, the backflush device is first rotated into the position in which the filtrate pipe connection 22 is connected to the filtrate chamber 19' and the mud drain connecting piece 23 is connected to the mud chamber 24' of the filter chamber 14', the filter cartridges 16' of which are to be flushed back. As a backflush fluid serves, as already mentioned, filtrate which fills the filtrate chamber 19 at this point in time as well as the tube section 26 and the dip tube 25 immersed therein in the backflush device essentially completely. Subsequently the two ball plugs 43, 44 are rotated simultaneously in their valve housings by means of the common drive 41 and their drive shaft 42, whereby, due to the larger ball bore 46 in the ball plug 44 of the mud drain valve this already opens a bit, while the flush valve with the smaller valve bore is still completely closed. As soon as the mud drain valve starts opening, the fluid pressure breaks down, which was up to then present in the mud chamber 24' of the filter chamber 14', the filter inserts 15' of which shall be flushed back. A part of the fluid which is not yet filtered which is present in the mud chamber 24' can be discharged by means of the mud drain line 38.

On further rotation of the drive shaft 42 through the common drive, not only the mud drain valve is opened completely, but also the flush valve which then connects the compressed air line 34 to the compressed air storage 36, in which the compressed air is contained under a pressure clearly larger than atmospheric pressure which then suddenly flows through the compressed air line 34 into the annular chamber 32 above the tube section 26 and then acts on the filtrate fluid level which present there.

The filtrate which is present in the backflush device 20 is pressed downwards in the tube section 26 and is pressed upwards in the dip tube 25 immersed into this and reaches the inside of the filter cartridges 16' through the filtrate chamber 19 and the openings 18, through which it flows from the inside to the outside, whereby the contaminations adhering to the outside of the filter cartridges are loosened. The dip tube which is immersed in the tube section forms together it an acceleration path for the backflush fluid by means of the developing U-tube effect, which thereby flows with a high velocity through the filter means of the filter cartridges. The contaminations which are detached from the outside of the filter cartridge in such a manner are discharged through the second ball valve at the mud outlet by means of the mud drain connecting piece 23 and the mud drain line 38.

For the finishing of the backflush process, the two ball valves 35 and 39 are closed again, whereby the flush valve 35 closes before the mud drain valve 39 due to its smaller valve bore 45. When the mud drain valve is also completely closed, the fluid pressure in the mud chamber 24' can build up again, so that the fluid can flow through the filter cartridges again from the outside to the inside and can exit as filtrate at the upper openings 18 and can arrive in the filter chamber 14', from which it first flows into the inside of the backflush device, so as to fill this again. When switching the backflush device to the next filter chamber to be cleaned, the connection of the filter chamber 14' to the filtrate pipe connection 22 of the backflush device is separated; the filtrate then flows from the filter chamber 14' to a filtrate drain line 47 and from there back to the motor or another machine in which it is used as operating fluid.

For an essentially complete venting of the filter chamber after a backflush process serves a float-actuated system vent valve 48 which ensures that the pressure in the filtrate cycle of the backflush filter cannot increase more than ambient pressure while the fluid level is under a value at which the filter chambers are not (yet) filled again completely with fluid.

It can be seen that, due to the particularly simple arrangement of the two valves 35 and 39 and the common drive for these, it is possible, without elaborate control mechanisms, only as a result of the different valve bores, to ensure that the mud drain valve always opens before the flush valve when a backflush process is to be initiated, so that the pressure level on the mud side of the filter inserts to be flushed back has always already dropped before the filtrate serving for the backflush is loaded by the compressed air and is pressed through the U-shaped acceleration path. By this, a best possible cleaning result is always achieved.

The invention claimed is:

1. Backflush filter having several filter chambers which receive filter inserts which can be flushed back by means of a flush filtrate loaded with compressed air, said backflush filter comprising:
   a filter housing,
   a backflush device rotatably mounted in said housing around a rotary axis, said backflush device comprises a filtrate pipe connection and a mud drain connecting piece, whereby, for the backflushing, said filtrate pipe connection can be brought into fluid communication with a filtrate chamber of respectively one of said filter chambers which are arranged concentrically around said rotary axis and simultaneously said mud drain connecting piece can be brought into communication with a mud chamber of said respectively one filter chamber, said backflush filter further comprising a pressure chamber for flush gas and a flush valve closing said pressure chamber or releasing it to said backflush device, and said backflush filter further comprising a mud outlet and a mud drain valve closing said mud outlet or releasing it to said mud drain connecting piece wherein said flush valve and said mud drain valve are actuated by a common drive whereas said flush valve only releases the connection to said backflush device when said mud drain valve has already released the connection between said mud drain connecting piece and said mud outlet at least partially, said flush valve and said mud drain valve are ball valves, wherein said flush ball valve has a ball bore which is smaller than a ball bore of said mud drain ball valve.

2. Backflush filter as claimed in claim 1 wherein said valves having a common drive shaft.

3. Backflush filter as claimed in claim 1, wherein said mud drain ball valve has a first valve plug and said flush ball valve has a second valve plug, said first valve plug having a larger ball diameter than said second valve plug.

4. Backflush filter having several filter chambers which receive filter inserts which can be flushed back by means of a flush filtrate loaded with compressed air, said backflush filter comprising:
   a filter housing,
   a backflush device rotatably mounted in said housing around a rotary axis said backflush device comprises a filtrate pipe connection and a mud drain connecting piece, whereby, for the backflushing, said filtrate pipe connection can be brought into fluid communication with a filtrate chamber of respectively one of said filter chambers which are arranged concentrically around said rotary axis and simultaneously said mud drain connecting piece can be brought into communication with a mud chamber of said respectively one filter chamber, said backflush filter further comprising a pressure chamber for flush gas and a flush valve closing said pressure chamber or releasing it to said backflush device, and said backflush filter further comprising a mud outlet and a mud drain valve closing said mud outlet or releasing it to said mud drain connecting piece wherein said flush valve and said mud drain valve are actuated by a common drive whereas said flush valve only releases the connection to said backflush device when said mud drain valve has already released the connection between said mud drain connecting piece and said mud outlet at least partially, said flush valve and said mud drain valve are ball valves, wherein said mud drain ball valve has a first valve plug and said flush ball valve has a second valve plug, said first valve plug having a larger ball diameter than said second valve plug.

5. Backflush filter as claimed in claim 4 wherein said valves having a common drive shaft.

6. Backflush filter having several filter chambers which receive filter inserts which can be flushed back by means of a flush filtrate loaded with compressed air, said backflush filter comprising:
   a filter housing,
   a backflush device rotatably mounted in said housing around a rotary axis, said backflush device comprises a filtrate pipe connection and a mud drain connecting piece, whereby, for the backflushing, said filtrate pipe connection can be brought into fluid communication with a filtrate chamber of respectively one of said filter chambers which are arranged concentrically around said rotary axis and simultaneously said mud drain connecting piece can be brought into communication with a mud chamber of said respectively one filter chamber, said backflush filter further comprising a pressure chamber for flush gas and a flush valve closing said pressure chamber or releasing it to said backflush device, and said backflush filter further comprising a mud outlet and a mud drain valve closing said mud outlet or releasing it to said mud drain connecting piece wherein said flush valve and said mud drain valve are actuated by a common drive whereas said flush valve only releases the connection to said backflush device when said mud drain valve has already released the connection between said mud drain connecting piece and said mud outlet at least partially, said flush valve and said mud drain valve are coupled to one another mechanically, wherein said flush valve and said mud drain valve are ball valves, said flush ball valve has a ball bore which is smaller than a ball bore of said mud drain ball valve, said mud drain ball valve has a first valve plug and said flush ball valve has a second valve plug, and said first valve plug having a larger ball diameter than said second valve plug.

* * * * *